(12) United States Patent
Itamoto

(10) Patent No.: US 9,411,449 B2
(45) Date of Patent: Aug. 9, 2016

(54) MOBILE TERMINAL AND OPERATION METHOD THEREFOR

(71) Applicant: NEC CASIO Mobile Communications, Ltd., Kanagawa (JP)

(72) Inventor: Shinichi Itamoto, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 15 days.

(21) Appl. No.: 14/377,512

(22) PCT Filed: Jan. 9, 2013

(86) PCT No.: PCT/JP2013/050172
§ 371 (c)(1),
(2) Date: Aug. 8, 2014

(87) PCT Pub. No.: WO2013/118522
PCT Pub. Date: Aug. 15, 2013

(65) Prior Publication Data
US 2015/0011263 A1    Jan. 8, 2015

(30) Foreign Application Priority Data
Feb. 8, 2012    (JP) .................................. 2012-024924

(51) Int. Cl.
*G06F 3/041* (2006.01)
*G06F 3/0488* (2013.01)
*G06F 1/16* (2006.01)
*H04M 1/02* (2006.01)

(52) U.S. Cl.
CPC .............. *G06F 3/041* (2013.01); *G06F 1/1616* (2013.01); *G06F 1/1649* (2013.01); *G06F 1/1692* (2013.01); *G06F 1/1694* (2013.01); *G06F 3/0488* (2013.01); *G06F 3/04883* (2013.01); *H04M 1/0202* (2013.01); *H04M 1/0266* (2013.01); *G06F 2203/04104* (2013.01); *H04M 2250/16* (2013.01); *H04M 2250/22* (2013.01)

(58) Field of Classification Search
CPC ........................................................ G06F 3/041
USPC ...................... 455/550.1, 556.1, 575.1, 575.3
See application file for complete search history.

(56) References Cited

U.S. PATENT DOCUMENTS

| | | | |
|---|---|---|---|
| 7,046,235 B2 * | 5/2006 | Katoh ........................... | 345/173 |
| 8,933,874 B2 * | 1/2015 | Lundqvist et al. ............ | 345/108 |
| 2011/0209098 A1 | 8/2011 | Hinckley et al. | |

FOREIGN PATENT DOCUMENTS

| | | |
|---|---|---|
| EP | 2341418 | 7/2011 |
| JP | 2007-141029 | 6/2007 |
| JP | 2009-157908 | 7/2009 |
| JP | 2009-187290 | 8/2009 |

(Continued)

OTHER PUBLICATIONS

International Search Report PCT/JP2013/050172 dated Apr. 9, 2013.

(Continued)

*Primary Examiner* — Tuan H Nguyen
(74) *Attorney, Agent, or Firm* — Young & Thompson

(57) ABSTRACT

Mobile terminal (1) includes touch panels 10a and 10b, one on each surface of housing (2). When touch operations are simultaneously performed on touch panels 10a and 10b, an action corresponding to combination of the touch operations is performed.

9 Claims, 11 Drawing Sheets

(56) References Cited

FOREIGN PATENT DOCUMENTS

| JP | 2009187290 | * | 8/2009 | ............ G06F 3/041 |
| JP | 2010-257259 | | 11/2010 | |

OTHER PUBLICATIONS

European search report, dated Sep. 1, 2015; Application No. 13747217.1.

* cited by examiner (a)

(b)

(c)

(a)

(b)

MOBILE TERMINAL AND OPERATION METHOD THEREFOR

TECHNICAL FIELD

The present invention relates to a mobile terminal and an operation method therefor, and more particularly to a mobile terminal that is operated using a touch panel, and an operation method therefor.

BACKGROUND ART

In recent years, smartphones, used as mobile terminals, have come into widespread use. The smartphone is operated through detection of a touch operation on an information display surface, thereby widening the area of the information display surface, thus improving visibility and increasing the amount of information.

Patent Literature 1 discloses a technique in which one surface of a mobile terminal is used as an information display surface, a touch sensor is provided on each surface of the mobile terminal, and information displayed on the information display surface is selected by moving a finger so as to trace desired information on the touch sensor in each surface of the mobile terminal.

CITATION LIST

Patent Literature

PTL 1: JP2007-141029A

SUMMARY OF INVENTION

Technical Problem

As described above, according to the technique disclosed, in Patent Literature 1, information displayed on the information display surface is selected by moving a finger so as to trace desired information on the touch sensor in each surface of the mobile terminal. Thus, when the mobile terminal is held by a single hand, information can be selected using two fingers, but the fingers are to be moved based on the information displayed on the information display surface, which is not different from a normal operation method using a touch panel.

In view of the above technical problem, the present invention has been made, and an object of the present invention is to provide a mobile terminal on which an input corresponding to a touch operation is performed and which allows for an operation corresponding to a routine action to be carried out, and an operation method therefor.

Solution to Problem

In order to achieve the above object, a first mobile terminal according to the present invention provides a mobile terminal including:

a first touch operation section that is provided on a first surface of a housing and on which a touch operation is performed; a second touch operation section that is provided on a second surface opposite to the first surface of the housing and on which a touch operation is performed; and a controller that executes an action corresponding to an input by the touch operations performed on the first and second touch operation sections, wherein when the touch operations are simultaneously performed on the first touch operation section and the second touch operation section, the controller executes an action corresponding to a combination of the touch operations.

Further, a second mobile terminal according to the present invention is a mobile terminal including:

two housings that are foldably connected to each other and that each have, on one surface thereof, a touch operation section on which a touch operation is performed; and a controller that executes an action corresponding to an input by the touch operation performed on said touch operation section, wherein in a state in which the two housings are folded such that the touch operation sections are oriented outward, when the touch operations are simultaneously performed on the touch operation sections of the two housings, the controller executes an action corresponding to a combination of the touch operations.

Further, a first operation method according to the present invention is an operation method for a mobile terminal, the mobile terminal including:

a first touch operation section that is provided on a first surface of a housing and on which a touch operation is performed; a second touch operation section that is provided on a second surface opposite to the first surface of the housing and on which a touch operation is performed; and a controller that executes an action corresponding to an input by the touch operations performed on the first and second touch operation sections, wherein
when the touch operations are simultaneously performed on the first touch operation section and on the second touch operation section, an action corresponding to a combination of the touch operations is executed.

Furthermore, a second operation method according to the present invention is an operation method for a mobile terminal, the mobile terminal including:

two housings that are foldably connected to each other and that each have, on one surface thereof, a touch operation section on which a touch operation is performed; and a controller that executes an action corresponding to an input by the touch operation performed on said touch operation section, wherein in a state in which the two housings are folded such that the touch operation sections are oriented outward, when the touch operations are simultaneously performed on the touch operation sections of the two housings, an action corresponding to a combination of the touch operations is executed.

Advantageous Effects of Invention

The present invention can provide a mobile terminal on which an input corresponding to a touch operation is performed and which allows for an operation to be carried out corresponding to a routine action such as picking up and putting a virtual object (e.g., an icon, data, non-displayed information, and the like).

DESCRIPTION OF EMBODIMENTS

Hereinafter, exemplary embodiments will be described with reference to the accompanying drawings.

Figure 1:
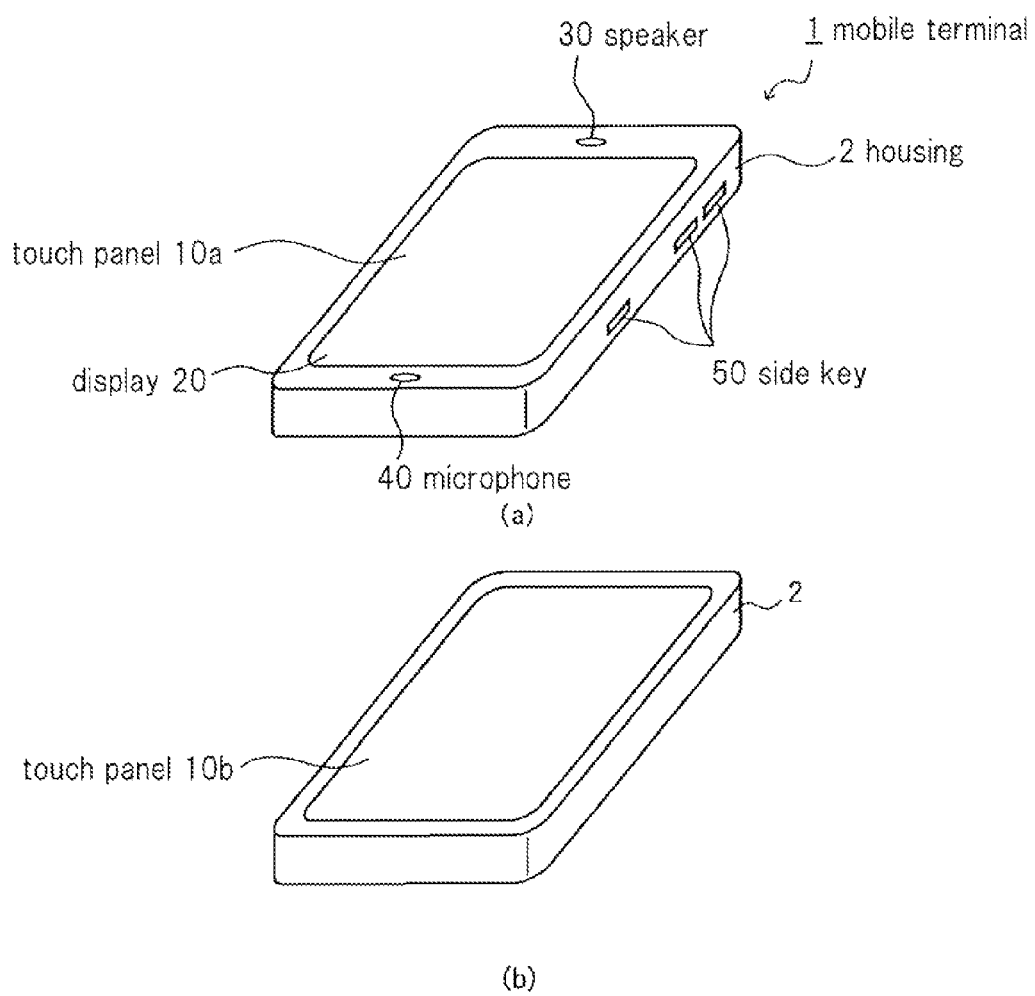
FIG. 1 is a view illustrating an exemplary embodiment of a mobile terminal, with FIG. 1(a) being an external perspective view as viewed from one surface side and FIG. 1(b) being an external perspective view as viewed from the other surface.
Figure 2:
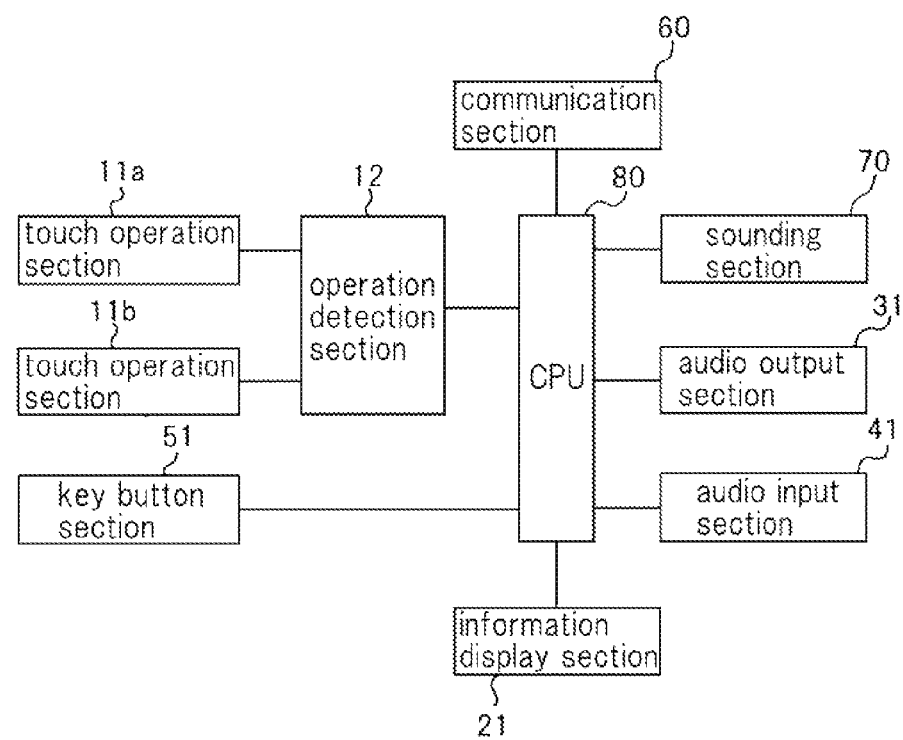
FIG. 2 is a block diagram illustrating an example of an internal configuration of the mobile terminal illustrated in FIG. 1.

FIG. 1 is a view illustrating an exemplary embodiment of a mobile terminal, with FIG. 1(a) being an external perspective view as viewed from one surface side and FIG. 1(b) being an external perspective view as viewed from the other surface. FIG. 2 is a block diagram illustrating an example of an internal configuration of mobile terminal 1 illustrated in FIG. 1.

As illustrated in FIGS. 1 and 2, the present exemplary embodiment is configured such that touch panel 10a, display 20, speaker 30, and microphone 40 are provided on one surface as a first surface of flat plate-like housing 2, and touch panel 10b is provided on a second surface opposite to the first surface of housing 2. In addition, side keys 50 are provided on a side surface of housing 2.

Display 20 is made of liquid crystal and the like, and serves as information display section 21 to display information under control of CPU 80.

Touch panel 10a is provided on display 20 and serves as first touch operation section 11a. When a touch operation is performed by a touch body such as a finger, first touch operation section 11a detects the touch operation.

Speaker 30 serves as audio output section 31. Under control of CPU 80, audio output section 31 outputs a sound including speech received through communication section 60.

Microphone 40 serves as audio input section 41 into which a sound is inputted.

Touch panel 10b serves as second touch operation section 11b. When a touch operation is performed by a contact body such as a finger, second touch operation section 11b detects the touch operation.

Side key 50 serves as key button section 51 into which information for operating mobile terminal 1 is inputted.

Communication section 60 transmits and receives information through a mobile terminal network.

Operation detection section 12 determines the operations by the touch operations performed on touch operation sections 11a and 11b and provides the input corresponding to the operation for CPU 80.

Sounding section 70 includes a buzzer or the like, which outputs a sound such as a ringtone.

CPU 80 includes a memory (unillustrated) therein and serves to control entire mobile terminal 1. CPU 80 executes an action corresponding to an input operation performed on operation detection section 12. More specifically, CPU 80 and operation detection section 12 constitute the controller of the present invention.

Hereinafter, the operation method for mobile terminal 1 configured as described above will be described.

Figure 3:
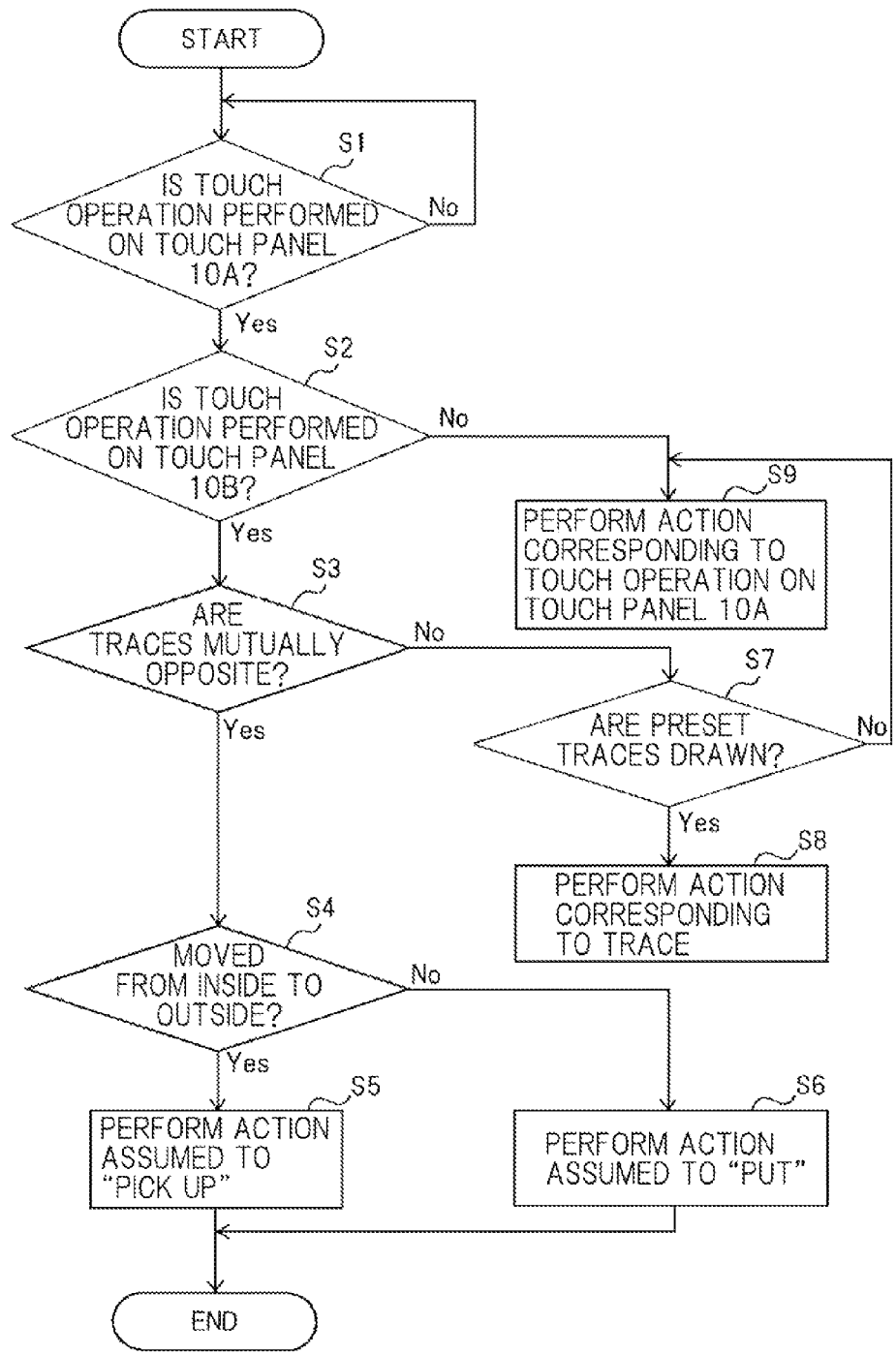
FIG. 3 is a flowchart for describing an example of an operation method for the mobile terminal illustrated in FIGS. 1 and 2.

FIG. 3 is a flowchart for describing an example of the operation method for mobile terminal 1 illustrated in FIGS. 1 and 2.

In mobile terminal 1 illustrated in FIGS. 1 and 2, a touch operation is performed on touch panel 10a and the touch operation is detected by touch operation section 11a (step 1); and at the same time, a touch operation is also performed on touch panel 10b and the touch operation is detected by touch operation section 11b (step 2). Then, operation detection section 12 determines the operations detected by touch operation sections 11a and 11b. More specifically, operation detection section 12 determines whether or not the touch operation on touch panel 10a and the touch operation on touch panel 10b draw mutually opposite traces (step 3). Note that the term "mutually opposite traces" as used herein refers to any traces which are not limited to positions and traces where the touch operation on touch panel 10a and the touch operation on touch panel 10b are accurately opposite to each other, but include slightly shifted positions and traces against the positions and traces where the touch operation on touch panel 10a and the touch operation on touch panel 10b are opposite to each other.

If the touch operation on touch panel 10a and the touch operation on touch panel 10b draw mutually opposite traces, operation detection section 12 determines whether or not the traces based on the touch operations are moved from inside to outside touch panels 10a and 10b (step 4).

If the traces based on the touch operations on touch panels 10a and 10b look like flicking from inside to outside touch panels 10a and 10b respectively, such an action as can be reasonably assumed to pick up mobile terminal 1 among the actions of mobile terminal 1 is executed under control of CPU 80 (step 5). For example, when the aforementioned action is performed on one of images displayed as thumbnails on display 20, the image will be enlarged and displayed.

If the traces based on the touch operations on touch panels 10a and 10b look like flicking from outside to inside touch panels 10a and 10b respectively, such an action as can be reasonably assumed to put or press mobile terminal 1 among the actions of mobile terminal 1 is executed under control of CPU 80 (step 6). For example, when the aforementioned action is performed on one of images displayed as thumbnails on display 20, clipping or capturing is executed on the image.

Meanwhile, if the touch operation on touch panel 10a and the touch operation on touch panel 10b do not draw mutually opposite traces, operation detection section 12 determines whether or not the trace of the touch operation on touch panel 10a and the trace of the touch operation on touch panel 10b drew preset traces respectively (step 7). If the preset traces are drawn, an action corresponding to the traces is executed under control of CPU 80 (step 8). For example, when one of a plurality of images displayed as thumbnails on display 20 is flicked from an upper side to a lower side on touch panel 10a and the image is flicked from a lower side to an upper side on touch panel 10b from a state of touching touch panels 10a and 10b, the image will be erased. Alternatively, the action may be an operation of activating a browser.

Figure 4:
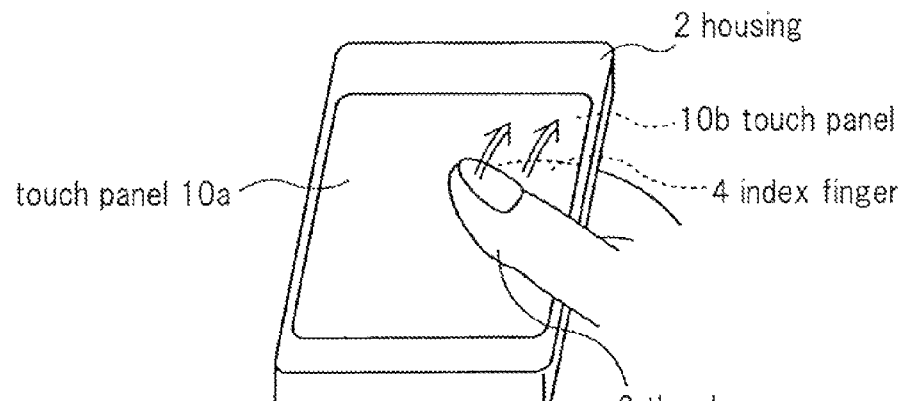
FIG. 4 is a view illustrating an example of a touch operation on the mobile terminal illustrated in FIG. 1.
Figure 4:
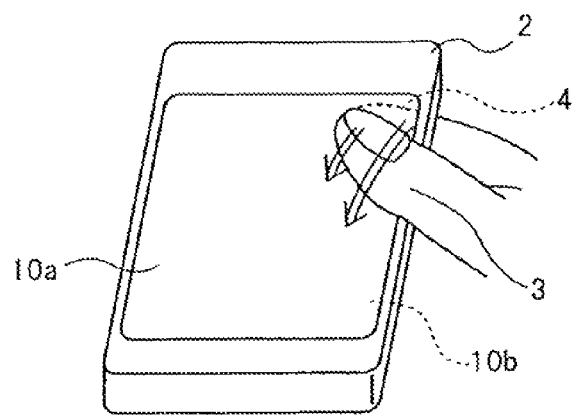
Figure 4:
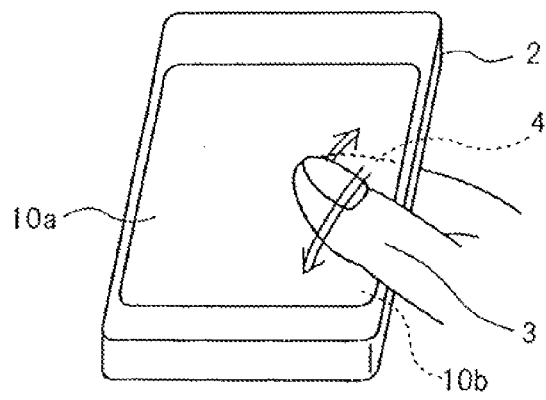

FIG. 4 is a view illustrating an example of a touch operation on mobile terminal 1 illustrated in FIG. 1.

As illustrated, in FIG. 4(a), when the trace of the touch operation on touch panel 10a carried out by thumb 3 and the trace of the touch operation on touch panel 10a carried out by index finger 4 look like flicking from inside to outside touch panels 10a and 10b respectively, such an action as can be reasonably assumed to pick up mobile terminal 1 is executed as described above.

Alternatively, as illustrated in FIG. 4(b), when the trace of the touch operation on touch panel 10a carried out by thumb 3 and the trace of the touch operation on touch panel 10a carried out by index finger 4 look like flicking from outside to inside touch panels 10a and 10b respectively, such an action as can be reasonably assumed to place mobile terminal 1 is executed as described above.

Still alternatively, as illustrated in FIG. 4(c), when the trace of the touch operation on touch panel 10a carried out by thumb 3 and the trace of the touch operation on touch panel 10a carried out by index finger 4 are such that the trace on touch panel 10a looks like flicking from an upper side to a lower side by thumb 3, and the trace on touch panel 10b looks like flicking from a lower side to a upper side carried out by index finger 4, an action set corresponding to the trace is executed as described above.

Note that as described above, a process for an image displayed at the starting point of the trace of the touch operation may not be performed but a process for an image displayed at the end point of the trace of the touch operation may be performed.

Meanwhile, if a touch operation is performed on touch panel 10a and the touch operation is detected by touch operation section 11a, but if no touch operation is performed on touch panel 10b and no touch operation is detected by touch operation section 11b, then an action corresponding to the touch operation on touch panel 10a is executed under control of CPU 80 (step 9). For example, an action according to information displayed on a touch position of display 20 is executed.

Note that in step 5, if the traces of the touch operations on touch panels 10a and 10b are determined to look like flicking from outside to inside touch panels 10a and 10b respectively, the action of mobile terminal 1 may be considered to be controlled depending on whether or not the subsequent traces of the touch operations on touch panels 10a and 10b pass through the end portions of touch panels 10a and 10b respectively.

Figure 5:
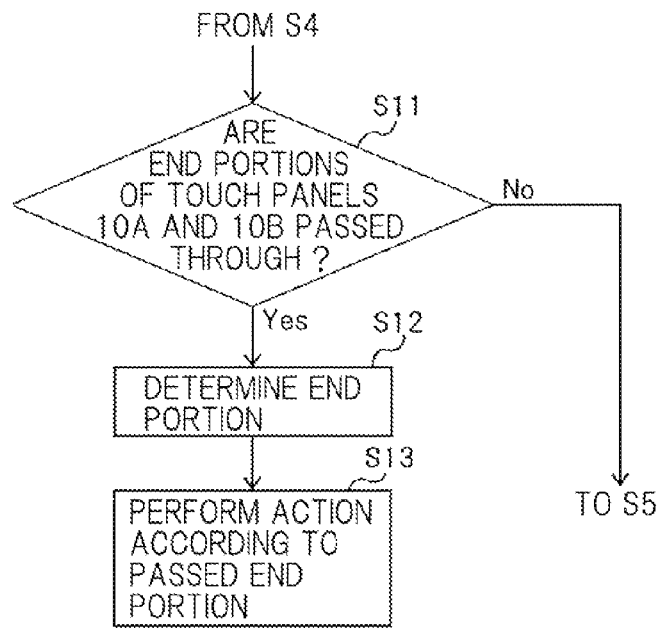
FIG. 5 is a flowchart for describing the operation method for the mobile terminal in a case where a touch operation on a touch panel passes through an end portion of the touch panel in the operation method illustrated in FIG. 3.

FIG. 5 is a flowchart for describing the operation method for mobile terminal 1 in a case where touch operations on touch panels 10a and 10b pass through end portions of touch panels 10a and 10b in the operation method illustrated in FIG. 3.

If the traces by the touch operations on touch panels 10a and 10b look like flicking from inside to outside touch panels 10a and 10b respectively, and if operation detection section 12 determines that the traces pass through the end portions of touch panels 10a and 10b (step 11), then operation detection section 12 determines which end portion of 4 end portions of each of touch panels 10a and 10b is passed through by the touch operation (step 12). Then, under control of CPU 80, an action according to the end portion passed through by the touch operation is executed (step 13).

Figure 6:
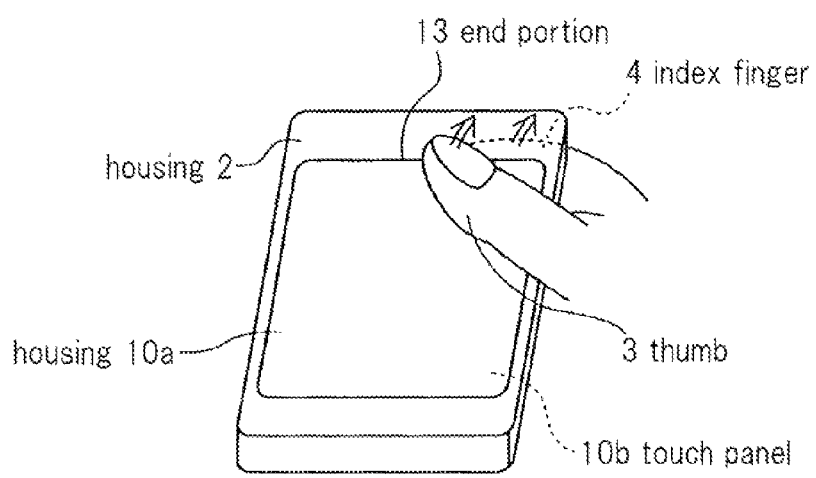
FIG. 6 is a view illustrating an example of the touch operation on the mobile terminal illustrated in FIG. 1.

FIG. 6 is a view illustrating an example of the touch operation on mobile terminal 1 illustrated in FIG. 1.

For example, in using a browser, when the trace of the touch operation on touch panel 10a carried out by thumb 3 and the trace of the touch operation on touch panel 10a carried out by index finger 4 pass through upper side end portions of touch panels 10a and 10b as illustrated in FIG. 6, an action such as emailing or citing and posting an URL of an object page displayed on display 20 is executed.

Note that each of touch panels 10a and 10b has 4 end portions. Thus, the action to be executed may be made different according to the end portion of touch panels 10a and 10b to be passed through by setting an action to be executed according to the end portion through which the traces of the touch operations pass in such a manner that when the traces of the touch operations on touch panels 10a and 10b pass through any one of the left and right side end portions of touch panels 10a and 10b, bookmark registration is performed; and when the traces pass through a lower side end portion, the object data is saved.

Meanwhile, when the traces of the touch operations on touch panels 10a and 10b do not pass through the end portions of touch panels 10a and 10b, the process moves to step 5.

Figure 7:
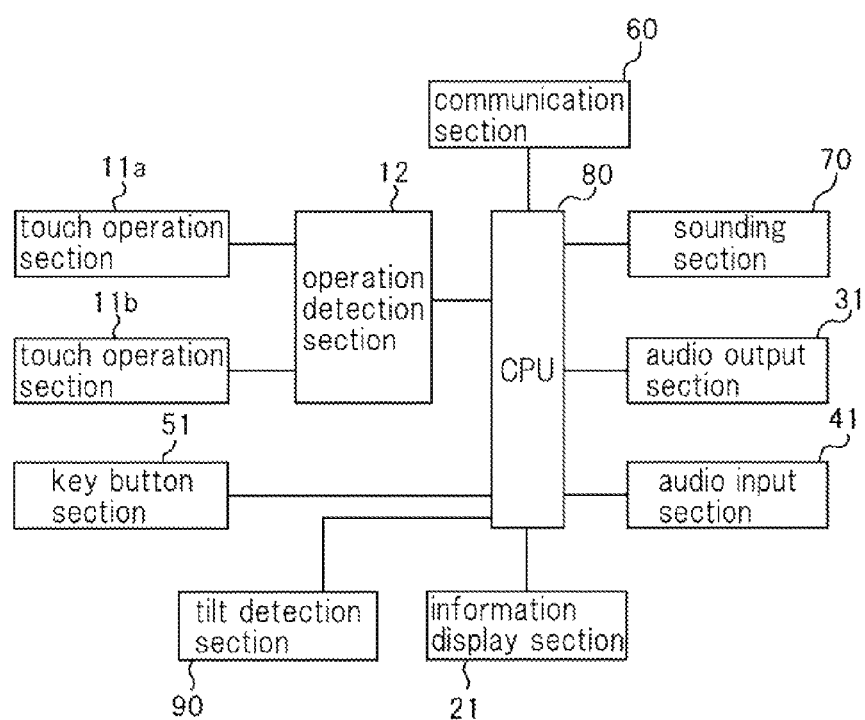
FIG. 7 is a block diagram illustrating another example of the internal configuration of the mobile terminal illustrated in FIG. 1.

FIG. 7 is a block diagram illustrating another example of the internal configuration of mobile terminal 1 illustrated in FIG. 1.

The present exemplary embodiment illustrated in FIG. 7 is different from the exemplary embodiment illustrated in FIG. 2 in that tilt detection section 90 is newly provided. Tilt detection section 90 detects the tilt of mobile terminal 1. More specifically, tilt detection section 90 detects the tilt of mobile terminal 1 by measuring the gravitational acceleration of the Earth using an acceleration sensor.

Hereinafter, the operation method fir mobile terminal 1 configured as described above will be described.

Figure 8:
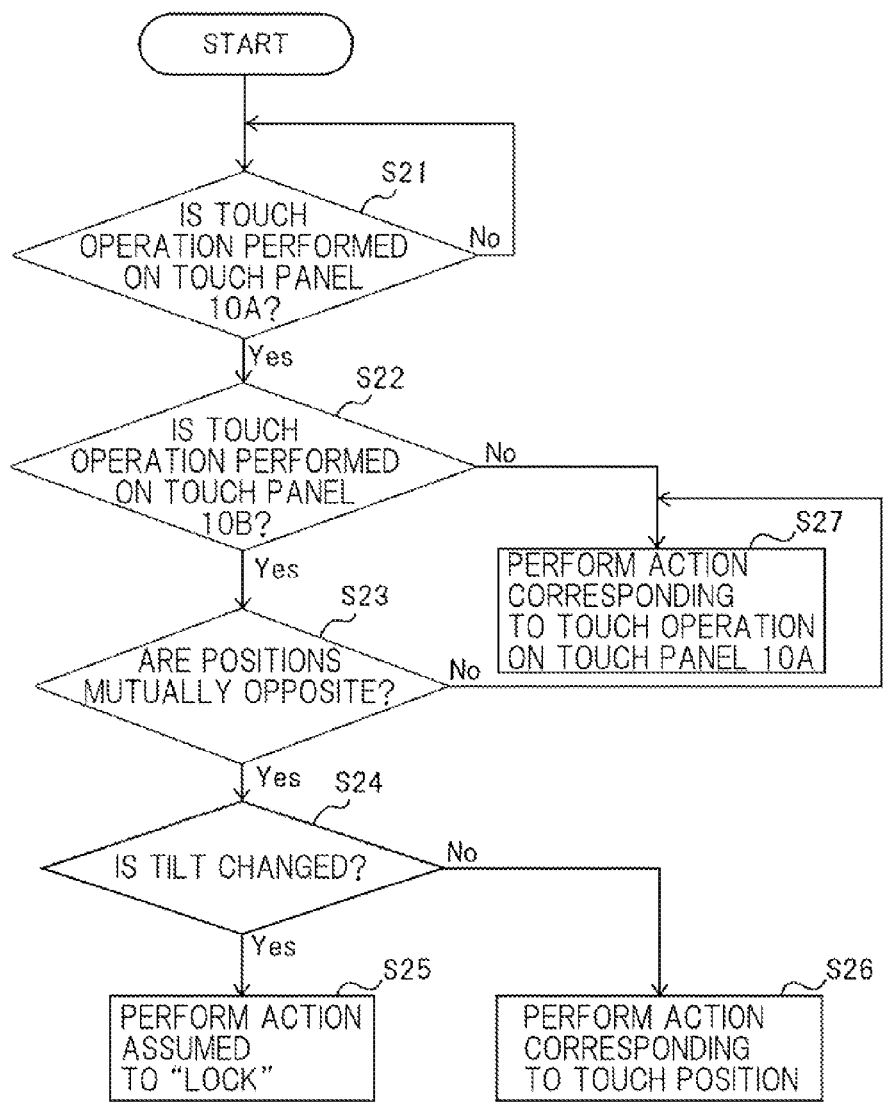
FIG. 8 is a flowchart for describing an example of the operation method for the mobile terminal having a configuration illustrated in FIG. 7.

FIG. 8 is a flowchart for describing an example of the operation method for mobile terminal 1 having a configuration illustrated in FIG. 7.

In mobile terminal 1 illustrated in FIG. 1, a touch operation is performed on touch panel 10a and the touch operation is detected by touch operation section 11a (step 21); and at the same time, a touch operation is also performed on touch panel 10b and the touch operation is detected by touch operation section 11b (step 22). Then, operation detection section 12 determines the touch positions by the touch operations detected by touch operation sections 11a and 11b. More specifically, operation detection section 12 determines whether or not the touch position on touch panel 10a and the touch position on touch panel 10b are mutually opposite positions (step 23).

If the touch position on touch panel 10a and the touch position on touch panel 10b are mutually opposite positions, CPU 80 determines whether or not the tilt of mobile terminal 1 detected by tilt detection section 90 is changed (step 24).

If the tilt of mobile terminal 1 detected by tilt detection section 90 is changed, such an action as can be reasonably assumed to lock among the actions of mobile terminal 1 is executed under control of CPU 80 (step 25). For example, if the tilt of mobile terminal 1 detected by tilt detection section 90 is changed by 90 degrees or more, the process moves to a lock mode of prohibiting the operation of mobile terminal 1.

Figure 9:
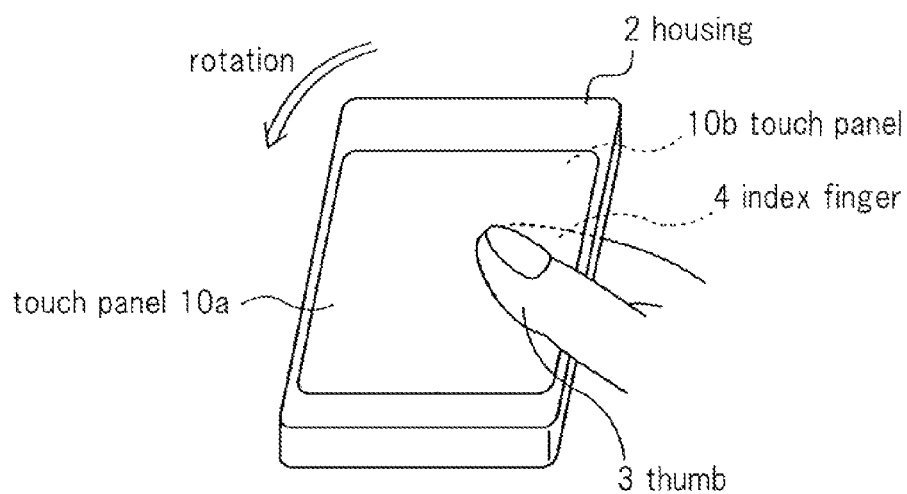
FIG. 9 is a view illustrating an example of a touch operation on the mobile terminal illustrated in FIG. 1.

FIG. 9 is a view illustrating an example of a touch operation on mobile terminal 1 illustrated in FIG. 1.

As illustrated in FIG. 9, in a state in which the touch position on touch panel 10a carried out by thumb 3 and the touch position on touch panel 10b carried out by index finger 4 are mutually opposite, when mobile terminal 1 is rotated by 90 degrees or more, the process moves to the lock mode of prohibiting the operation of mobile terminal 1 as described above.

Meanwhile, if the tilt of mobile terminal 1 detected by tilt detection section 90 is not changed, an action corresponding to the touch positions on touch panels 10a and 10b is executed under control of CPU 80 (step 26). For example, an action according to the information displayed on the touch position of display 20 is executed.

Meanwhile, if a touch operation is performed on touch panel 10a and the touch operation is detected by touch operation section 11a; but if no touch operation is performed on touch panel 10b and no touch operation is detected by touch operation section 11b, then an action corresponding to the touch operation on touch panel 10a is executed under control of CPU 80 (step 27). For example, an action according to the information displayed on the touch position of display 20 is executed.

Note that the acceleration sensor may be used not as tilt detection section 90 but as an acceleration detector so that CPU 80 may execute an action preset according to the magnitude and direction of the acceleration detected by the acceleration sensor.

Another Exemplary Embodiment

Figure 10:
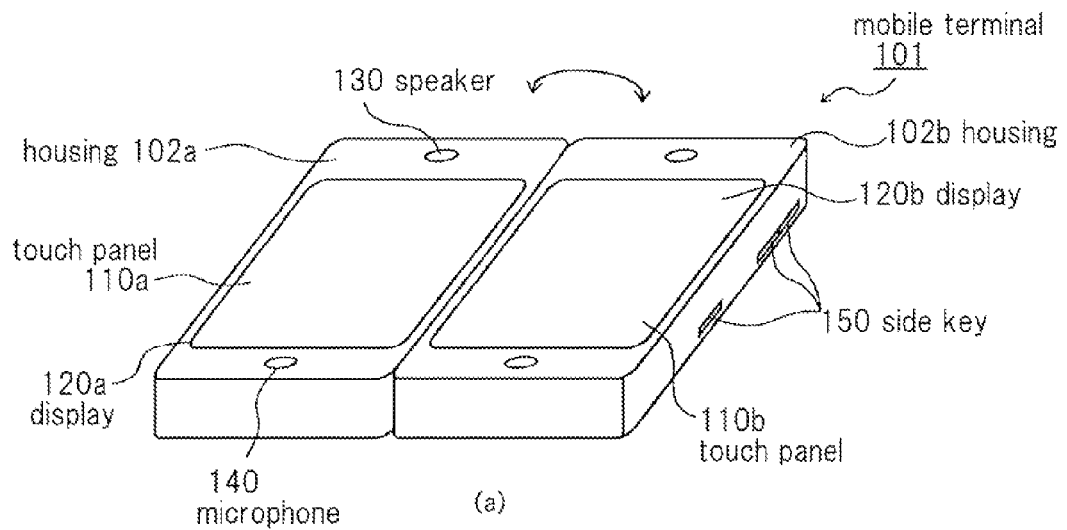
FIG. 10 is a view illustrating another exemplary embodiment of a mobile terminal, with FIG. 10(a) being an external perspective view where two housings are unfolded and FIG. 10(b) being an external perspective view where two housings are folded.
Figure 10:
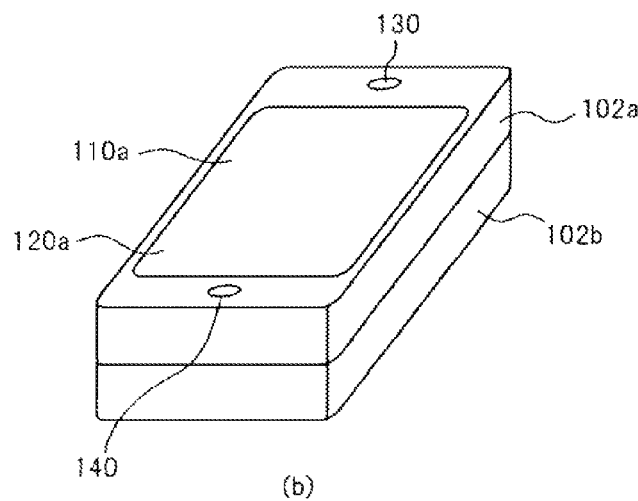

FIG. 10 is a view illustrating another exemplary embodiment of a mobile terminal, with FIG. 10(a) being an external perspective view where two housings are unfolded and FIG. 10(b) being an external perspective view where two housings are folded. In addition, FIG. 11 is a block diagram illustrating an example of an internal configuration of mobile terminal 101 illustrated in FIG. 10.

Figure 11:
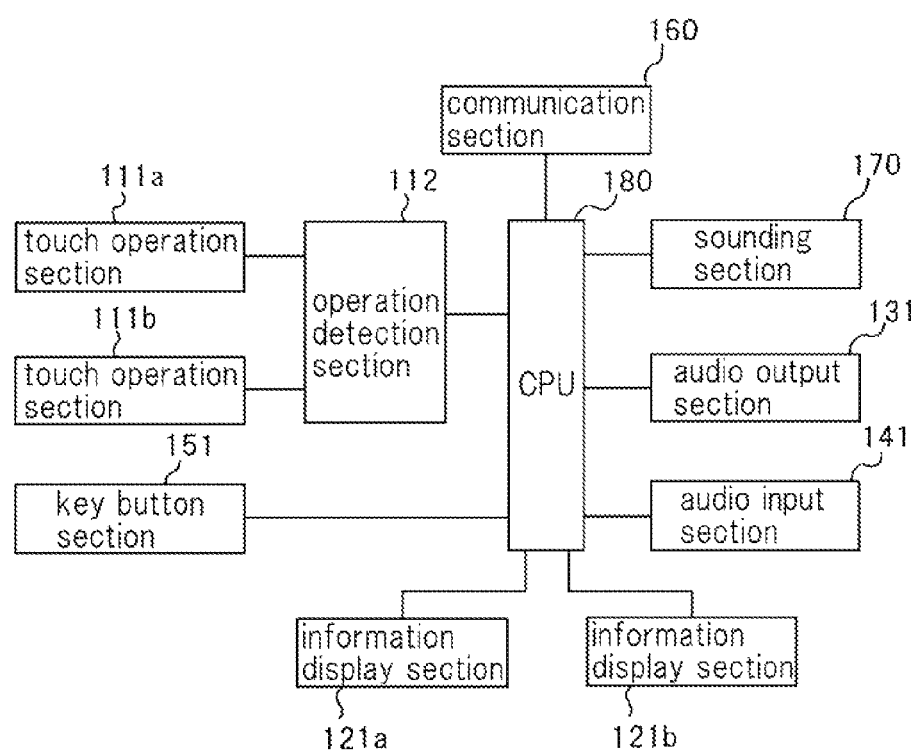
FIG. 11 is a block diagram illustrating an example of an internal configuration of the mobile terminal illustrated in FIG. 10.

As illustrated in FIGS. 10 and 11, the present exemplary embodiment is configured such that two flat plate-like housings 102a and 102b are foldably connected to each other and have displays 120a and 120b and touch panels 110a and 110b, respectively, which are provided on one surfaces of the housings 102a and 102b oriented outward in the folded state. In addition, speaker 130 and microphone 140 are provided on surfaces on which display 120a and touch panel 110a of housing 102a are provided; and side keys 150 are provided on a side surface of housing 102b.

Touch panels 110a and 110b, displays 120a and 120b, speaker 130, microphone 140, and side keys 150, which constitute touch operation sections 111a and 111b, information display sections 121a and 121b, audio output section 131, audio input section 141, and key button section 151, and further operation detection section 112, communication section 160, sounding section 170, and CPU 180 inside mobile terminal 101 execute the same operations as illustrated in FIGS. 1 and 2.

Hereinafter, the operation method for mobile terminal 101 configured as described above will be described.

Figure 12:
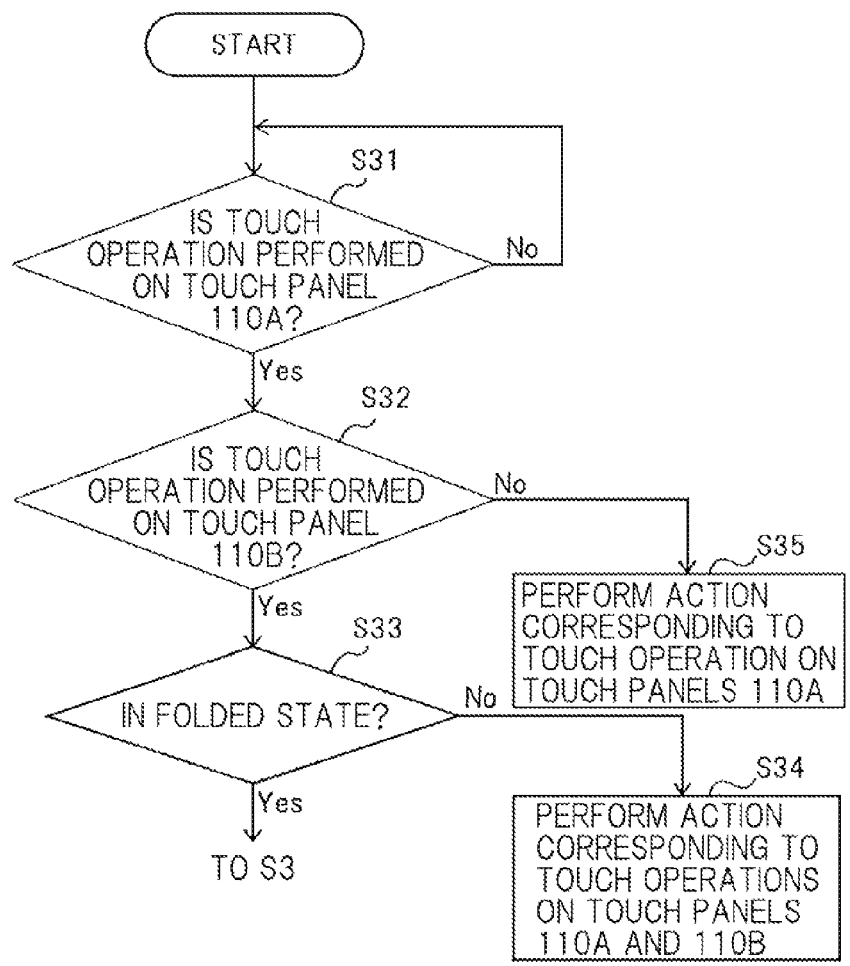
FIG. 12 is a flowchart for describing an example of the operation method for the mobile terminal having a configuration illustrated in FIGS. 10 and 11.

FIG. 12 is a flowchart for describing an example of the operation method for mobile terminal 101 having a configuration illustrated in FIGS. 10 and 11.

In mobile terminal 101 illustrated in FIG. 10, a touch operation is performed on touch panel 110a and the touch operation is detected by touch operation section 111a (step 31); and at the same time, a touch operation is also performed on touch panel 110b and the touch operation is detected by touch operation section 111b (step 32). Then, CPU 180 determines whether or not mobile terminal 101 is folded so that touch panels 110a and 110b and displays 120a and 120b are located outside as illustrated in FIG. 1(b) (step 33).

If mobile terminal 101 is folded so that touch panels 110a and 110b and displays 120a and 120b are located outside as illustrated in FIG. 1(b)), the process moves to step 3.

Meanwhile, if mobile terminal 101 is not folded as illustrated in FIG. 1(a), an action corresponding to the touch operations on touch panels 110a and 110b is executed under control of CPU 180 (step 34). Note that the action is different from the action in step 3. More specifically, if a touch operation is performed on each of touch panels 110a and 110b, the action to be performed is different between a state in which mobile terminal 101 is as illustrated in FIG. 1(a) and a state in which mobile terminal 101 is as illustrated in FIG. 1(b).

As described above, the action to be performed is different between the state in which mobile terminal 101 is as illustrated in FIG. 1(a) and the state in which mobile terminal 101 is as illustrated in FIG. 1(b). When mobile terminal 101 is not folded as illustrated in FIG. 1(b), an action corresponding to basic operations such as tap, double-tap, flick drag, and pinch in/out is executed. When mobile terminal 101 is folded as illustrated in FIG. 1(a), an operation corresponding to a routine action can be executed similar to the present invention.

Meanwhile, if a touch operation is performed on touch panel 110a and the touch operation is detected by touch operation section 111a, but if no touch operation is performed on touch panel 110b and no touch operation is detected by touch operation section 111b, then an action corresponding to the touch operation on touch panel 110a is executed under control of CPU 180 (step 35). For example, an action according to the information displayed on the touch position of display 120a is executed.

Note that as described above, examples of the actions to be executed by CPUs 80 and 180 may include bookmark registration when a browser is used; bookmark insertion when an e-book is used; clipboard registration and data saving when data is browsed; screen capture; start and end of saving (recording) when a video is viewed; data status change (unapproved→approved, etc.); and the like. The examples may further include receiving new messages; updating status information on the Web; switching on/off of communication means (e.g., WLAN, Bluetooth); off-hooking, holding on-hooking of a call; setting manner mode; and the like.

Hereinbefore, the present invention has been described with reference to exemplary embodiments, but the present invention is not limited to the above exemplary embodiments. Various modifications readily apparent to a person of ordinary skill in the art can be made to the configuration and the detail of the present invention within the scope of the present invention.

This application is based upon and claims the benefit of priority from the prior JP2012-024924A filed on Feb. 8, 2012, the entire contents of which are incorporated herein by reference.

REFERENCE SIGNS LIST 1, 101 mobile terminal
2, 102a, 102b housing
3 thumb
4 index finger
10a, 10b, 110a, 110b touch panel
11a, 11b, 111a, 111b touch operation section
12, 112 operation detection section
13 end portion
20, 120a, 120b display
21, 121a, 121b information display section 30, 130 speaker
31, 131 audio output section
40, 140 microphone
11, 141 audio input section
50, 150 side key
51, 151 key button section
60, 160 communication section
70, 170 sounding section
80, 180 CPU
90 tilt detection section

What is claimed is:

1. A mobile terminal comprising:
a housing comprised of a top side, a bottom side opposite the top side, and side edges that extend from said bottom side to said top side;
a first touch operation section provided on a first surface of the top side of said housing and on which a first touch operation is performed with a thumb of a first hand of a user to define a first trace;
a second touch operation section provided on a second surface opposite to the first surface of said housing and on which a second touch operation is performed with an index finger of the first hand of the user to define a second trace, the second surface being on the bottom side of said housing; and
a controller that executes an action corresponding to an input defined by the touch operations performed by at least one of i) the thumb of the first hand of the user on said first operation section and ii) the index finger of the first hand of the user on the second touch operation section, wherein,
when the controller detects the first trace on the first touch operation section, the controller determines whether the second trace has been simultaneously performed on second touch operation section, and i) when the controller determines the second trace has not been simultaneously performed on second touch operation section, the controller performs a first action corresponding to the first trace, and ii) when the controller determines that the first and second touch operations are simultaneously performed on said first touch operation section and said second touch operation section by the thumb of the first hand of the user on said first touch operation section and by the index finger of the first hand of the user on the second touch operation section, said controller a) determines an action, from a set of actions, that corresponds to a combination of the first and second traces defined by the first and second touch operations, and then b) executes the determined action corresponding to the combination of the first and second traces formed defined by the first and second touch operations.

2. The mobile terminal according to claim 1, wherein, when, the controller determines that the first and second touch operations are simultaneously performed, and the first touch operation on said first touch operation section and the second touch operation on said second touch operation section draw and define the first and second traces as mutually opposite traces, said controller determines that mutually opposite traces correspond to a first action of the set of actions, and then executes the first action of the set of actions corresponding to the first and second traces.

3. The mobile terminal according to claim 2, wherein when, the controller determines that the first and second touch operations are simultaneously performed, and the first and second traces of the touch operations pass through respective end portions of said first and second touch operation sections, said controller determines that mutually first and second traces correspond to a second action of the set of actions, and then executes the second action of the set of actions preset according to the passed end portions.

4. The mobile terminal according to claim 1, further comprising:
a tilt detector that detects a rotation of said mobile terminal, wherein
the controller determines that the first and second touch operations are simultaneously performed on said first touch operation section and said second touch operation section, when the rotation of said mobile terminal detected by said tilt detector is changed more than a preset amount, said controller executes an action, of the set of actions, preset according to the detected rotation of said mobile terminal.

5. The mobile terminal according to claim 1, comprising an acceleration detector that detects an acceleration applied to said mobile terminal, wherein
the controller determines that the first and second touch operations are simultaneously performed on said first touch operation section and said second touch operation section, when said acceleration detector detects the acceleration applied to said mobile terminal, said controller executes an action, of the set of actions, preset according to the magnitude and direction of the acceleration.

6. A mobile terminal comprising:
two housings that are foldably connected to each other and that each have, on one surface thereof, a touch operation section on which a respective touch operation is performed such that i) in an unfolded state a first touch operation section is adjacent a second touch operation section in a side-by-side arrangement, and ii) in a folded state the two housings define a folded housing with a top side, a bottom side opposite the top side, and side edges that extend from said bottom side to said top side the first touch operation section, wherein
the first touch operation section is provided on a first surface of the top side of said folded housing and on which a first touch operation is performed with a thumb of a first hand of a user to define a first trace,
the second touch operation section is provided on a second surface opposite to the first surface of said folded housing and on which a second touch operation is performed with an index finger of the first hand of the user to define a second trace, the second surface being on the bottom side of said folded housing,
said first and second touch operation sections being oriented outward in opposite directions; and
a controller that executes an action corresponding to an input defined by the touch operations performed on said touch operation sections, wherein
in the unfolded state, the controller performs actions based on the first trace on the first touch operation section, and
in the folded state, when the controller determines that the first and second touch operations are simultaneously performed on said first and second touch operation sections, said controller a) determines an action, from a set of actions, that corresponds to a combination of the first and second traces defined by the first and second touch operations, and then b) executes the determined action corresponding to the combination of the first and second traces formed defined by the first and second touch operations.

7. The mobile terminal according to claim 6, wherein
when the touch operations are simultaneously performed on said touch operation sections of said two housings, said controller executes different operations between the unfolded state in which said two housings are not folded and the folded state in which said two housings are folded so that said touch operation sections are oriented outward in opposite directions.

8. An operation method for a mobile terminal, comprising the steps of:
operating the mobile terminal, the mobile terminal comprising a housing comprised of a top side, a bottom side opposite the top side, and side edges that extend from said bottom side to said top side; a first touch operation section provided on a first surface of the top side of said housing and on which a first touch operation is performed with a thumb of a first hand of a user to define a first trace;
a second touch operation section provided on a second surface opposite to the first surface of said housing and on which a second touch operation is performed with an index finger of the first hand of the user to define a second trace, the second surface being on the bottom side of said housing; and a controller that executes an action corresponding to an input defined by the touch operations performed by at least one of i) the thumb of the first hand of the user on said first operation section and ii) the index finger of the first hand of the user on the second touch operation section; and
when the controller detects the first trace on the first touch operation section, the controller determines whether the second trace has been simultaneously performed on second touch operation section, and i) when the controller determines the second trace has not been simultaneously performed on second touch operation section, the controller performs a first action corresponding to the first trace, and ii) when the controller determines that the first and second touch operations are simultaneously performed on said first touch operation section and said second touch operation section by the thumb of the first hand of the user on said first touch operation section and by the index finger of the first hand of the user on the second touch operation section, said controller a) determines an action, from a set of actions, that corresponds to a combination of the first and second traces defined by the first and second touch operations, and then b) executes the determined action corresponding to the combination of the first and second traces formed defined by the first and second touch operations.

9. An operation method for a mobile terminal, comprising the steps of:
operating the mobile terminal comprising two housings that are foldably connected to each other and that each have, on one surface thereof, a touch operation section on which a respective touch operation is performed such that i) in an unfolded state a first touch operation section is adjacent a second touch operation section in a side-by-side arrangement, and ii) in a folded state the two housings define a folded housing with a top side, a bottom side opposite the top side, and side edges that extend from said bottom side to said top side the first touch operation section, wherein
the first touch operation section is provided on a first surface of the top side of said folded housing and on which a first touch operation is performed with a thumb of a first hand of a user to define a first trace,
the second touch operation section is provided on a second surface opposite to the first surface of said folded housing and on which a second touch operation is performed with an index finger of the first hand of the user to define a second trace, the second surface being on the bottom side of said folded housing,
said first and second touch operation sections being oriented outward in opposite directions; and a controller that executes an action corresponding to an input defined by the touch operation performed on said touch operation sections; and
in the unfolded state, the controller performing actions based on the first trace on the first touch operation section, wherein,
in the folded state, when the controller determines that the first and second touch operations are simultaneously performed on said first and second touch operation sections, said controller a) determines an action, from a set of actions, that corresponds to a combination of the first and second traces defined by the first and second touch operations, and then b) executes the determined action corresponding to the combination of the first and second traces formed defined by the first and second touch operations.

* * * * *